United States Patent
Zuran

Patent Number: 5,347,978
Date of Patent: Sep. 20, 1994

[54] ECO-GRILL PAN

[76] Inventor: Johann Zuran, Köpenicker Strasse 161, D-1000 Berlin 47, Fed. Rep. of Germany

[21] Appl. No.: 13,782

[22] Filed: Feb. 5, 1993

[30] Foreign Application Priority Data

Feb. 5, 1992 [DE] Fed. Rep. of Germany ....... 4203726

[51] Int. Cl.$^5$ .............................................. F24C 3/00
[52] U.S. Cl. ............... 126/41 R; 126/25 R; 126/332; 99/445
[58] Field of Search ............ 126/41 R, 332, 221, 126/211, 25 R; 99/444, 445

[56] References Cited

U.S. PATENT DOCUMENTS

| | | | |
|---|---|---|---|
| 2,940,381 | 6/1960 | Cottongim et al. | 126/25 R X |
| 3,989,028 | 11/1976 | Berger | 126/25 R X |
| 4,930,491 | 6/1990 | Purello | . |
| 5,121,738 | 6/1992 | Harvis | 126/25 R X |

FOREIGN PATENT DOCUMENTS

| | | |
|---|---|---|
| 0214439 | 7/1986 | European Pat. Off. . |
| 2439570 | 2/1976 | Fed. Rep. of Germany . |
| 8804071 | 6/1988 | Fed. Rep. of Germany . |

*Primary Examiner*—Larry Jones
*Attorney, Agent, or Firm*—Notaro & Michalos

[57] ABSTRACT

An eco-grill pan with a grill surface formed of grill rods disposed at a distance from one another has fat drain channels disposed between them and a fat collecting channel. The grill pan is formed of one-piece construction and between the grill rods and each fat drain channel at least one fat drip edge exists and is disposed above a corresponding fat drain channel. Due to the overlapping, the dripping fat is collected by the fat drain channel. The fat collecting channel encircles the grill surface so that the collected fat can be collected and readily be poured off.

4 Claims, 5 Drawing Sheets ed, 5,347,978

ECO-GRILL PAN

BACKGROUND OF THE INVENTION

The invention relates to an eco-grill pan with an encircling edge, a grill surface which is formed by grill rods disposed at a distance to one another and fat drain channels disposed in between, and with a fat collecting channel.

A known grill pan of this type (DE-GM 82 28 063.0) comprises a single-piece metal foil with an encircling flange and a grill surface formed by a number of grooves disposed at an essentially uniform distance from one another with beads between them. At both narrow sides of the grill pan a collecting channel is provided and the two collecting channels are connected with one another by the two channels which are disposed adjoining the flange at the two long sides of the grill pan. Into the beads are worked recesses through which the radiation of the grill fire can impinge directly on the material to be grilled which is placed on the grill surface directly above the recesses.

In this known grill pan the problem exists of endangering health as well as increasing the accumulation of waste and consequently increasing the load on the environment. From the meat heated by the radiation of the grill fire the fat drips inter alia through the recesses in the beads into the grill fire and burns with the formation of a large quantity of soot. Herein the problem is given of the formation of carcinogens endangering health. It is known that in the combustion of the dripping fat, in particular of benzene and its homologues the flame generating a large amount soot comprises as solid substances annellated aromatic hydrocarbons, among them 3,4-benzpyrene, which is known as a carcinogen and which together with the rising soot reaches the material to be grilled. Furthermore, the development of smoke and dense smoke increased during the combustion of fat is also a factor for an undesirable loading of the environment as well as the increased waste accumulated through the metal foil which must be discarded after the use of the grill pan.

Known is furthermore a grill material support (grate) for a grill device heated primarily from below by means of a glowing charcoal fire.

Grill device (DE-GM 89 12 666.1), formed as a closed flat hollow body with a hollow space, is formed with a bowl comprising lower drip channels with rib-form reinforcements with heating gas penetration openings and an upper bowl implemented as a grate for the material to be grilled. The penetration openings in the upper and lower part of the hollow body are implemented so that they point jet-like toward the inside. The penetration openings are further implemented in the lower bowl so that they are offset relative to the penetration openings in the upper bowls. In the event of deposition of harmful substances on the base, this grill material support formed of a flexible foil is compressed after a single use and discarded as waste. Through the increased accumulation of waste, again an increased undesirable load of the environment results. Furthermore, the multipart structure of this known grill support proves to be relatively cost-intensive in the manufacture and in practice awkward to handle when pouring off the fat collected in the encircling fat collecting channel.

Known is further a grill grate for a charcoal grill with fat collecting arrangement (DE-GM 88 04 071.2) having an upper grate comprising rods disposed one next to the other with a rod width which is greater than one half the distance between the rods. On the lateral edges of the rods of the upper grate are provided drip edges. Further are provided a collecting grate and at its end several lateral collecting channels with drainage toward the outside. The collecting grate comprises trough-form rods which are arranged next to one another precisely under the gaps of the rods of the upper grate and which have a width which is greater than one-half the distance between the rods. The fat dripping from the lateral drip edges of the rods of the upper grate is collected by the lower collecting grate and guided into the lateral collecting channels. Simultaneously, the wood gases can reach the grill material between the rods of the two grates. But in the case of this grill grate, the multipart structure proves also to be relatively cost-intensive in the manufacture and in practice is awkward to handle when pouring off the dripped-off fat collected in the lateral collecting channels of the collecting grate.

Further prior art comprises subject matter according to the German utility patent GM 73 32 390 and GM 88 04 071.2 as well as DE-OS 37 15 621 A 1 and 8526 032 U and EP 0214 439.

SUMMARY OF THE INVENTION

The invention is based on the task of describing a grill pan of the initially stated type which is cost-effective, permanently reusable under the aspect of relieving the environment and the use of which does not impair health.

This task if solved according to the invention thereby that the grill pan is formed in one piece in such a way that between the grill rods and each fat drain channel is given at least one ventilation slit and at least one fat drip edge at each grill rod which are lower than the upper edge of the grill rod and disposed above the associated fat drip channel so as to overlap it, that the dripping fat is collected by the fat drain channel, and that the fat collecting channel is implemented in such a way that it encircles the grill surface at the inside of the edge.

Advantageous further developments on the eco-grill pan according to the invention are evident in patent claims 1 to 4.

The grill rods of the eco-grill pan can be disposed at a relatively uniform or non-uniform distance and can have an additional forming-in. The eco-grill pan can be formed in one piece of a Niro steel sheet, an aluminum sheet or a steel sheet or can be formed as a cast piece. The ventilation slits can extend over the entire length of the grill rods or only over a part of the length of the grill rods. The grill rods and the fat drain channels can in cross section be implemented so as to be pointed, rounded-off, trapezoidal, or in a combination of these shapes, and can be disposed circularly, semicircularly, parallel or radially.

The grill pan according to the invention is advantageous in particular thereby that in contrast to the conventional grill grates it can be manufactured as a one-piece cast body and consequently can be manufactured simply as a cost-effective household item. In contrast to the conventional grill pans comprising disposable foils the dripped off fat collected during the grilling in the eco-grill pan according to the invention can be poured off safely. Because of the absence of foil accumulation, through the eco-grill pan according to the invention the environment is not loaded through additional waste.

Furthermore, the eco-grill pan according to the invention is permanently usable and can be cleaned readily in a dishwashing machine. Moreover, it can be used with any heating source customary for grilling, for example in place of a conventional grilling device on a charcoal fire. Since when using the eco-grill pan according to the invention no fat can drip into the heat source, the endangerment of health does not exist. At the same time, however, through the specific arrangement of the ventilation slits and ventilation recesses the typical flavor and taste of grilled material is achieved. The eco-grill pan according to the invention consequently meets extremely well the ecological requirements of today.

BRIEF DESCRIPTION OF THE DRAWINGS

Preferred embodiments of the eco-grill pan according to the invention will be explained in the following in conjunction with the drawings. Therein show:

FIG. 1, and FIG. 19 a partial side view of the one-piece eco-grill pan according to FIG. 6, left view, with implemented grill rods and fat drain channels implemented in cross section.

DESCRIPTION OF THE PREFERRED EMBODIMENT

Figure 1:
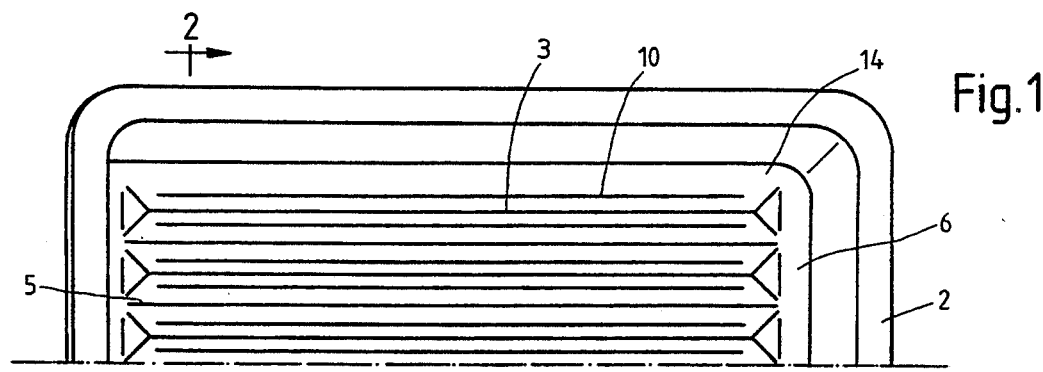
FIG. 1 a perspective view of a one-piece eco-grill pan.
Figure 2:
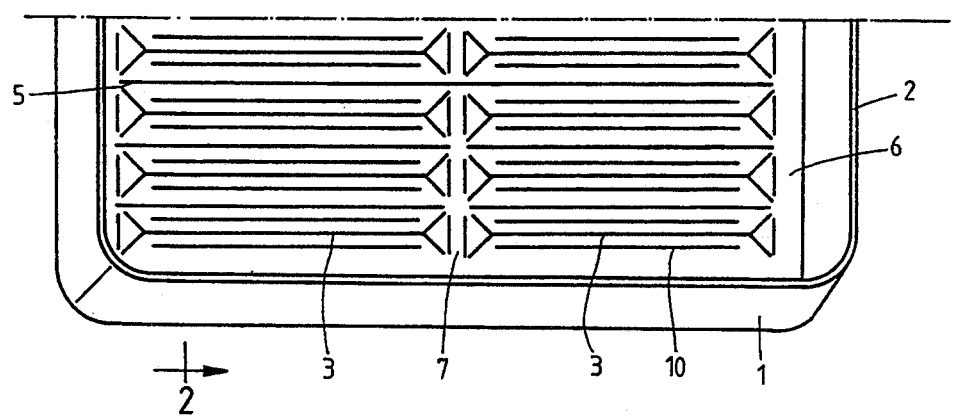
FIGS. 2 to 4 cross-sectional views of different implementations of the one-piece eco-grill pan in which on the grill rods only one fat drip edge is provided, FIGS. 5 to 6 cross-sectional views of different implementations of the one-piece eco-grill pan in which on the . . . (missing), FIG. 7 perspective section representation of the one-piece eco-grill pan with rounded-off grill rods and fat drip channels as a cast piece or formed glass part, FIG. 8 perspective section representation of the one-piece eco-grill pan in trapezoidal form with fat collecting channel in which on the grill rods only one fat drip edge is provided, FIG. 9 perspective section representation of the one-piece eco-grill pan with rounded-off grill rods and only one fat drip edge, FIG. 10 perspective section representation of the one-piece eco-grill pan with additional forming-in of the grill rods and the fat drain channels, FIG. 11 views of half longitudinal sections through the one-piece eco-grill pan wherein in the left or in the right half of the figure the embodiment is shown with a continuous or with a discontinuous ventilation slit, FIG. 12 views of half longitudinal sections such as in FIG. 11 wherein, however, oblique lateral formings-out are provided, FIG. 13 views of half longitudinal sections through the one-piece eco-grill pan in which the configuration according to FIGS. 11 and 12 are combined, FIG. 14 partial top views of the one-piece eco-grill pan in different variants and specifically
 I. with continuous grill rods and ventilation slits,
 II. with continuous grill rods and discontinuous ventilation slits,
 III. with discontinuous grill rods and ventilation slits, FIG. 15 partial top views of the one-piece eco-grill pan in two variants, and specifically;
 IV. with continuous ventilation slits and grill rods and fat collecting channel disposed transversely on one side,
 V. with discontinuous ventilation slits and continuous grill rods and fat collecting channel disposed transversely on one side, FIG. 16 partial views of the one-piece eco-grill pan according to FIG. 13 and FIG. 14 I, with pointed and rounded-off implementation of the grill rods and the fat drain channel, FIG. 17 views of half longitudinal sections through the one-piece eco-grill pan with centrally disposed fat collecting channel according to FIG. 14 III or FIG. 1, FIG. 18 views of half longitudinal sections through the one-piece eco-grill pan with a transverse fat collecting channel and continuous or discontinuous ventilation slits in the left or the right half of the figure according to FIG. 15 IV., FIG. 15 V.
Figure 3:
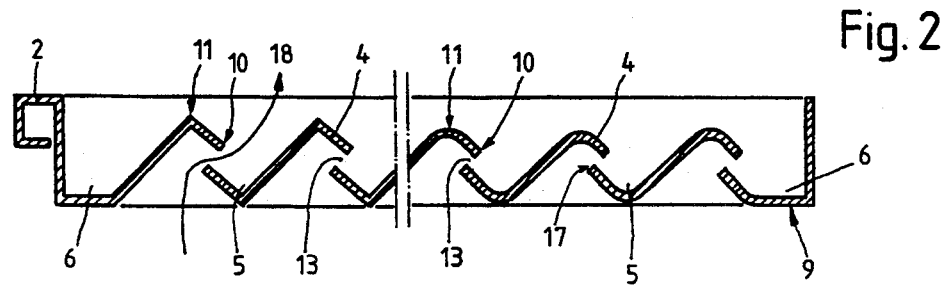
Figure 4:
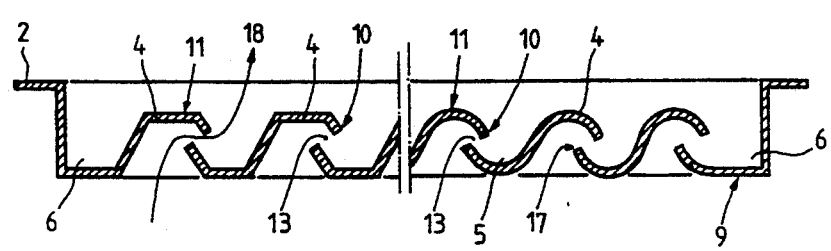
Figure 10:
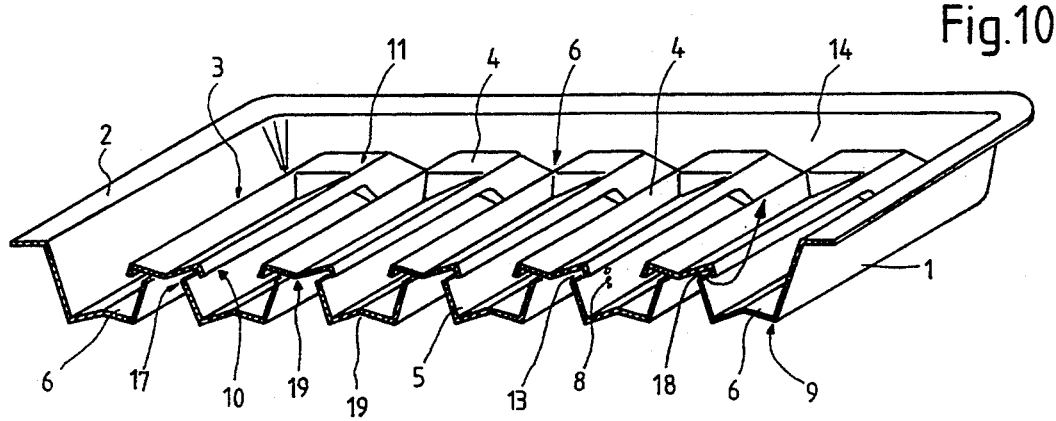
Figure 11:
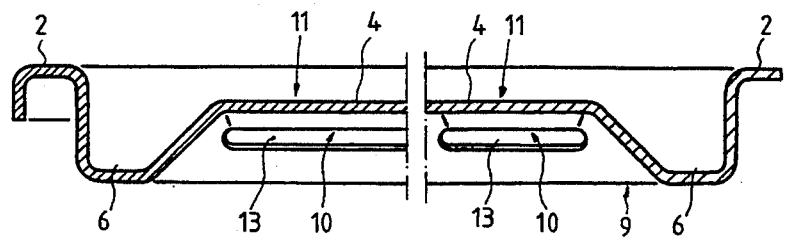
Figure 12:
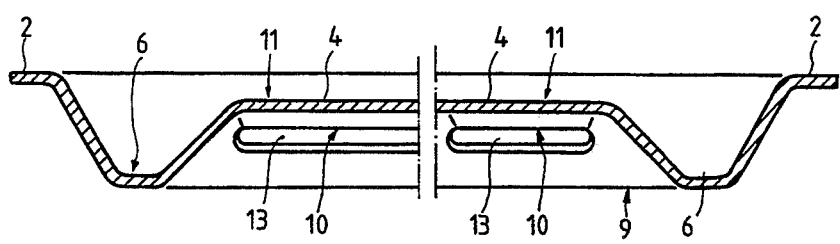
Figure 13:
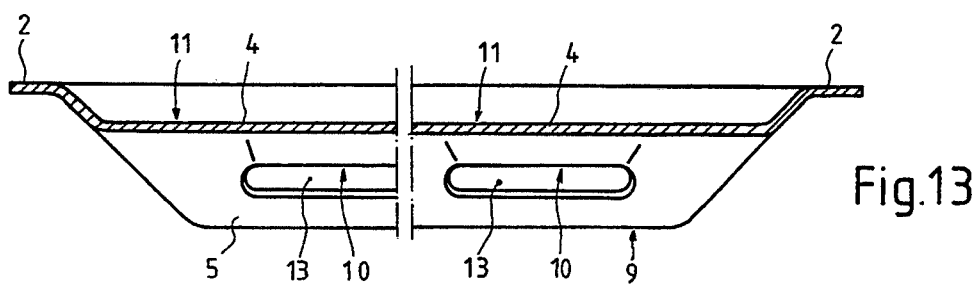
Figure 14:
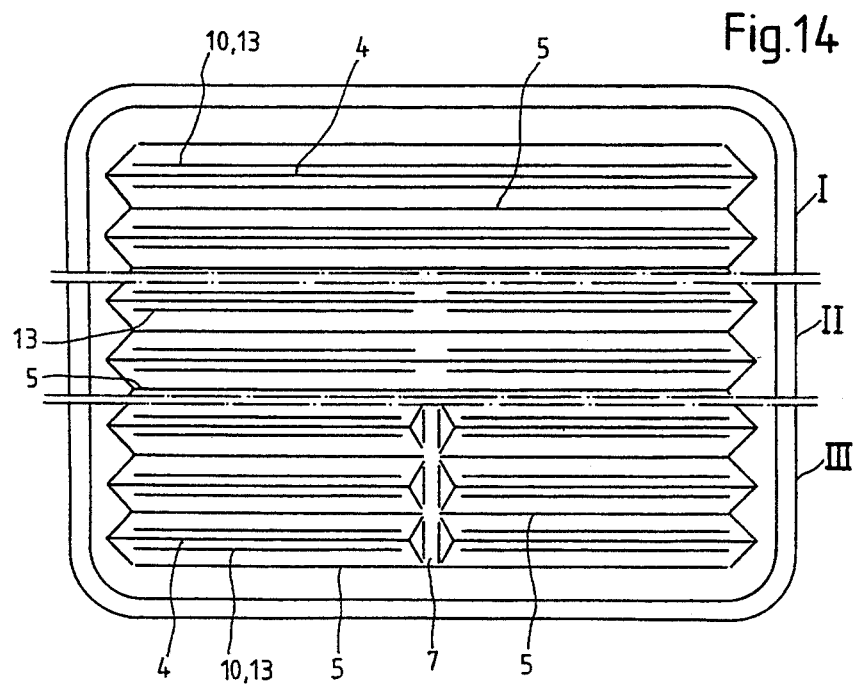
Figure 15:
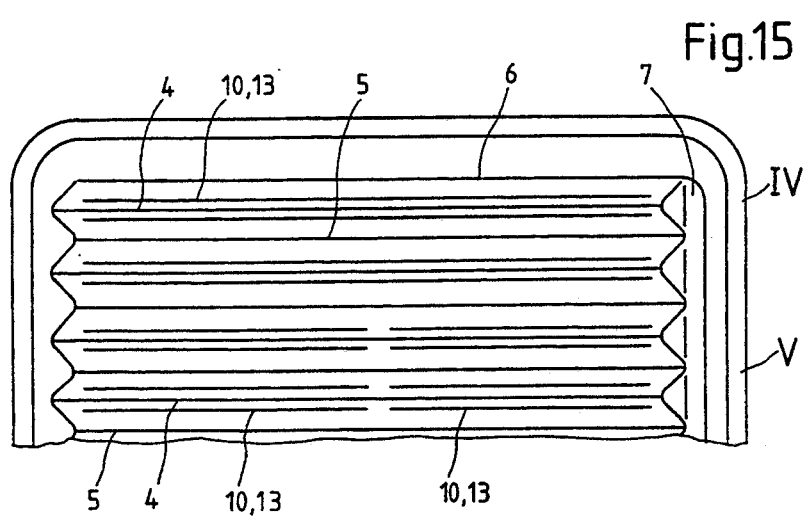
Figure 16:
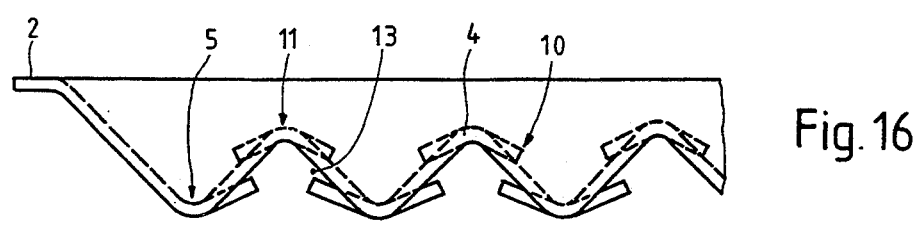
Figure 17:
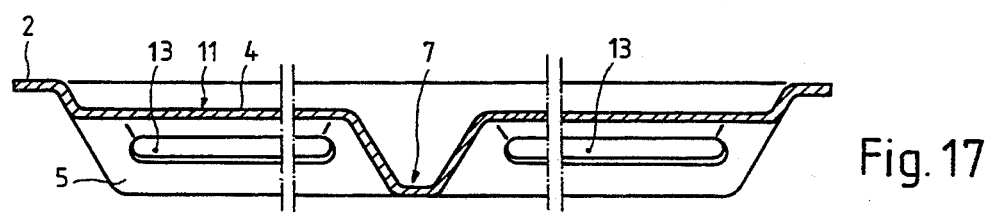
Figure 18:
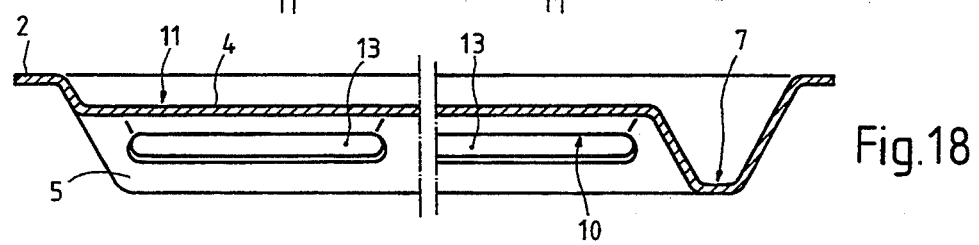
Figure 19:
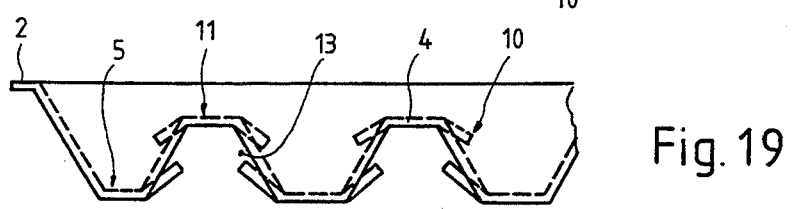

As is evident in particular from FIGS. 1 to 6 the eco-grill pan 1 implemented as a one-piece cast body has an encircling edge 2 and a grill surface 3 which comprises grill rods 4 disposed at a distance from one another and fat drain channels 5 disposed between them. Inside of the edge 2 is provided fat collecting channel 6 encompassing the grill surface 3. In addition, as illustrated in FIG. 1, a transverse fat collecting channel 7 can be provided. In the preferred embodiments according to FIGS. 2 to 4 and 7 to 9 between each grill rod 4 and each fat drain channel 5 is provided a ventilation slit 13. The hot air or heating coal gases 18 generated by the (not shown) heat source stream from bottom 9 of the eco-grill pan 1 through the ventilation slits 13 to the grill material (not shown) disposed on the grill rods 4, heat it and grill it. Fat and meat juice 8 drip over the fat drip edge 10 of each grill rod 4 into the associated fat drain channel 5. The fat drip edge 10 is disposed lower than the upper edge 11 of the grill rods 4 and is disposed in each instance so that the dripping fat/meat juice 8 is collected by the fat drain channels 5. From here the fat 8 flows into the encircling fat collecting channel 6 and the transverse fat collecting channel 7 and can subsequently be poured readily from the eco-grill pan 1. In the upper edges 17 of the fat drain channels 5 to increase the effectivity of the eco-grill pan 1 can be provided ventilation recesses 12 (FIG. 10). The one-piece eco-grill pan 1 is preferably provided with a coating 14 meeting the legal provisions governing food (FIG. 1).

Figure 5:
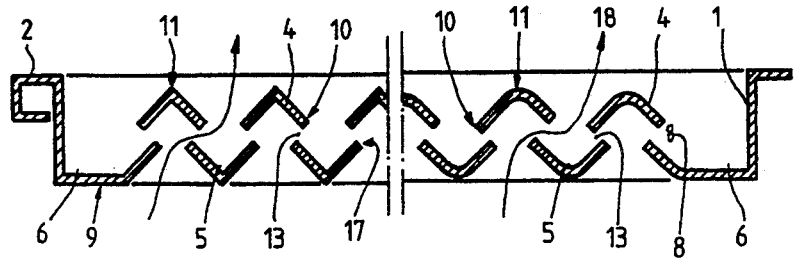
Figure 6:
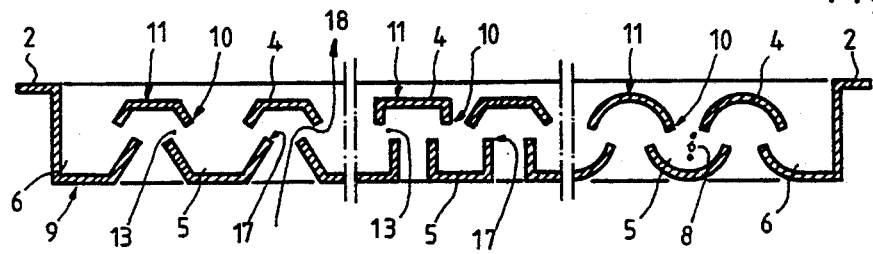
Figure 7:
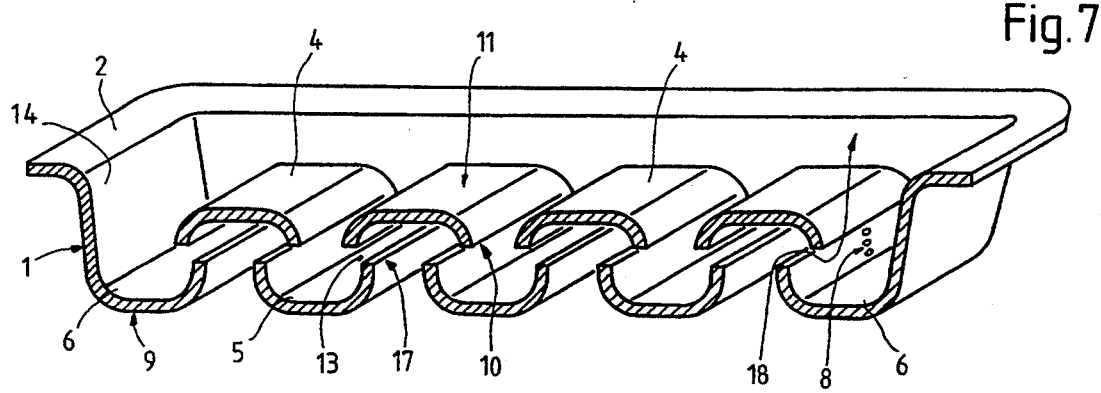
Figure 8:
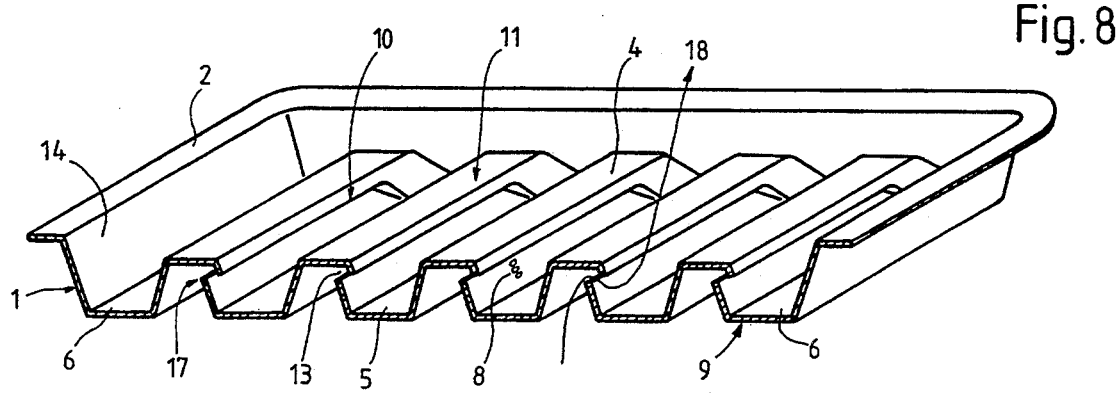
Figure 9:
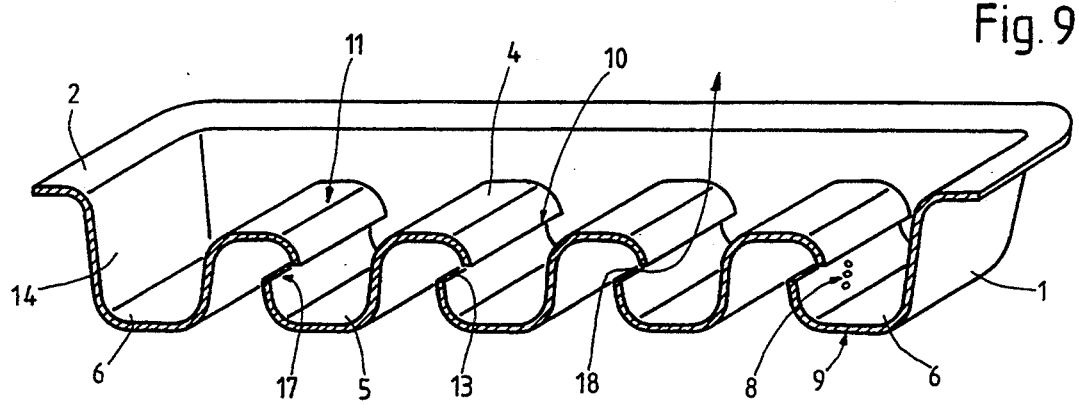

In FIGS. 5 and 6 are depicted two embodiments of the one-piece eco-grill pan 1 in which on each side of each grill rod 4 a fat drip edge 10 is provided. Grill rods 4 and fat drain channels 5 are, as shown in the cited figures, are formed in any geometric shape or combination of the latter.

What is claimed is:

1. A grill pan comprising:
 a grill surface (3) of one-piece casting having an edge (2) at a periphery of the grill surface (3) and a collecting channel (6) at an inner side of the edge (2) and having a plurality of grill rods (4) spaced apart from one another and a drain channel (5) positioned beneath each space between the grill rods (4), each grill rod (4) and each drain channel (5) defining a ventilation slit (13) therebetween, each grill rod (4) having an upper edge (11) and at least one drip edge (10) lower than the upper edge (11), the grill surface (3) also having a collecting channel (7) transverse to the drain channels (8).

2. The grill pan according to claim 1, including a coating (14) on the grill surface (3).

3. The grill pan according to claim 1, wherein the ventilation slit (13) extends over a portion of the length of the grill rod (4) and the drain channel (5).

4. The grill pan according to claim 1, wherein the grill rod (4) and the drain channel (5) have an inclined 2 shape cross-section.

* * * * *